US009915929B1

(12) United States Patent
Dubinsky et al.

(10) Patent No.: US 9,915,929 B1
(45) Date of Patent: Mar. 13, 2018

(54) MONITORING AVAILABILITY OF FACILITY EQUIPMENT

(71) Applicant: Amazon Technologies, Inc., Seattle, WA (US)

(72) Inventors: David Magee Dubinsky, Leesburg, VA (US); Kris Scott Steigerwald, Takoma Park, MD (US); Steven Richard Stolarski, Harpers Ferry, WV (US); Kraig Knight, Ashburn, VA (US); Shelton George Gregory, Leesburg, VA (US)

(73) Assignee: Amazon Technologies, Inc., Seattle, WA (US)

( * ) Notice: Subject to any disclaimer, the term of this patent is extended or adjusted under 35 U.S.C. 154(b) by 712 days.

(21) Appl. No.: 14/502,683

(22) Filed: Sep. 30, 2014

(51) Int. Cl.
| | |
|---|---|
| G06F 17/30 | (2006.01) |
| G06Q 10/00 | (2012.01) |
| G05B 15/02 | (2006.01) |
| H04L 29/08 | (2006.01) |

(52) U.S. Cl.
CPC .............. *G05B 15/02* (2013.01); *H04L 67/10* (2013.01)

(58) Field of Classification Search
CPC ........ G05B 15/02; H04L 67/10; G06Q 10/06; G06Q 10/0631; G06Q 10/064; G06Q 10/10; G06Q 10/06395; G06Q 10/063; G06Q 10/01; Y10S 707/99945
See application file for complete search history.

(56) References Cited

U.S. PATENT DOCUMENTS

| | | | | |
|---|---|---|---|---|
| 7,567,844 | B2 * | 7/2009 | Thomas | G05B 15/02 348/143 |
| 7,882,158 | B2 * | 2/2011 | Dussud | G06F 12/0253 707/813 |
| 8,406,682 | B2 * | 3/2013 | Elesseily | G06Q 10/06 434/219 |
| 9,217,994 | B2 * | 12/2015 | Ainsley | G05B 15/02 |

(Continued)

OTHER PUBLICATIONS

O. W. Bertelsen, The activity walkthrough: an expert review method based on activity theory, Oct. 2004, 4 pages.*

(Continued)

*Primary Examiner* — Thuy Dao
(74) *Attorney, Agent, or Firm* — Lee & Hayes, PLLC

(57) ABSTRACT

Disclosed herein is a platform for monitoring the availability of facility equipment. The platform may include a facility equipment monitoring tool with access to configuration data for one or more facilities. The platform allows for deployment of a mobile client application across a plurality of mobile devices to facilitate performance of walk-through inspections (i.e., rounds) of equipment within respective facilities, and to provide real-time equipment availability indicators and other status indicators via a user interface of the application. The data collected during walk-through inspections may be logged and uploaded to a central server system and stored in a data repository. The platform may further provide a network-accessible monitoring dashboard for viewing real-time, and historical, data regarding the walk-through inspections performed at various facilities, and an administrative user interface to update configuration data in the data repository of the central server system.

20 Claims, 8 Drawing Sheets

(56) References Cited

U.S. PATENT DOCUMENTS

| | | | | |
|---|---|---|---|---|
| 2004/0164863 A1* | 8/2004 | Fallin | ............. | G08B 13/246 |
| | | | | 340/572.1 |
| 2010/0299179 A1* | 11/2010 | Alonso | ............. | G06Q 10/0637 |
| | | | | 705/7.36 |
| 2011/0010221 A1* | 1/2011 | Horn | ............. | G06Q 10/06 |
| | | | | 705/7.42 |
| 2013/0053063 A1* | 2/2013 | McSheffrey | ............. | G08B 7/066 |
| | | | | 455/456.1 |
| 2016/0036898 A1* | 2/2016 | Curtis | ............. | H04L 67/10 |
| | | | | 709/203 |

OTHER PUBLICATIONS

Wilson et al., ACH Walkthrough: A Distributed Multi-Device Tool for Collaborative Security Analysis, Nov. 2014, 8 pages.*

* cited by examiner

MONITORING AVAILABILITY OF FACILITY EQUIPMENT

BACKGROUND

Companies may operate facilities for carrying out a business. To run a business smoothly, facility operators are concerned with ensuring that their facilities are operating properly and that equipment within the facility is available and operational. For example, a company that operates a data center facility may be concerned with preventing, or at least mitigating, outages of the data center so the data center equipment remains available to customers. In order to mitigate such outages, the company must attempt to provide data center equipment that is consistently available and continually operating in a working state.

Facility operators typically employ people (e.g., technicians) to conduct frequent rounds of the facility to inspect various pieces of equipment in order to make sure that the equipment is in working order and other checks are being done. The people that conduct these rounds often use paper and pen to record data pertaining to the equipment they inspect, and the collected data is then manually transferred from the paper to an electronic spreadsheet after a round is completed.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
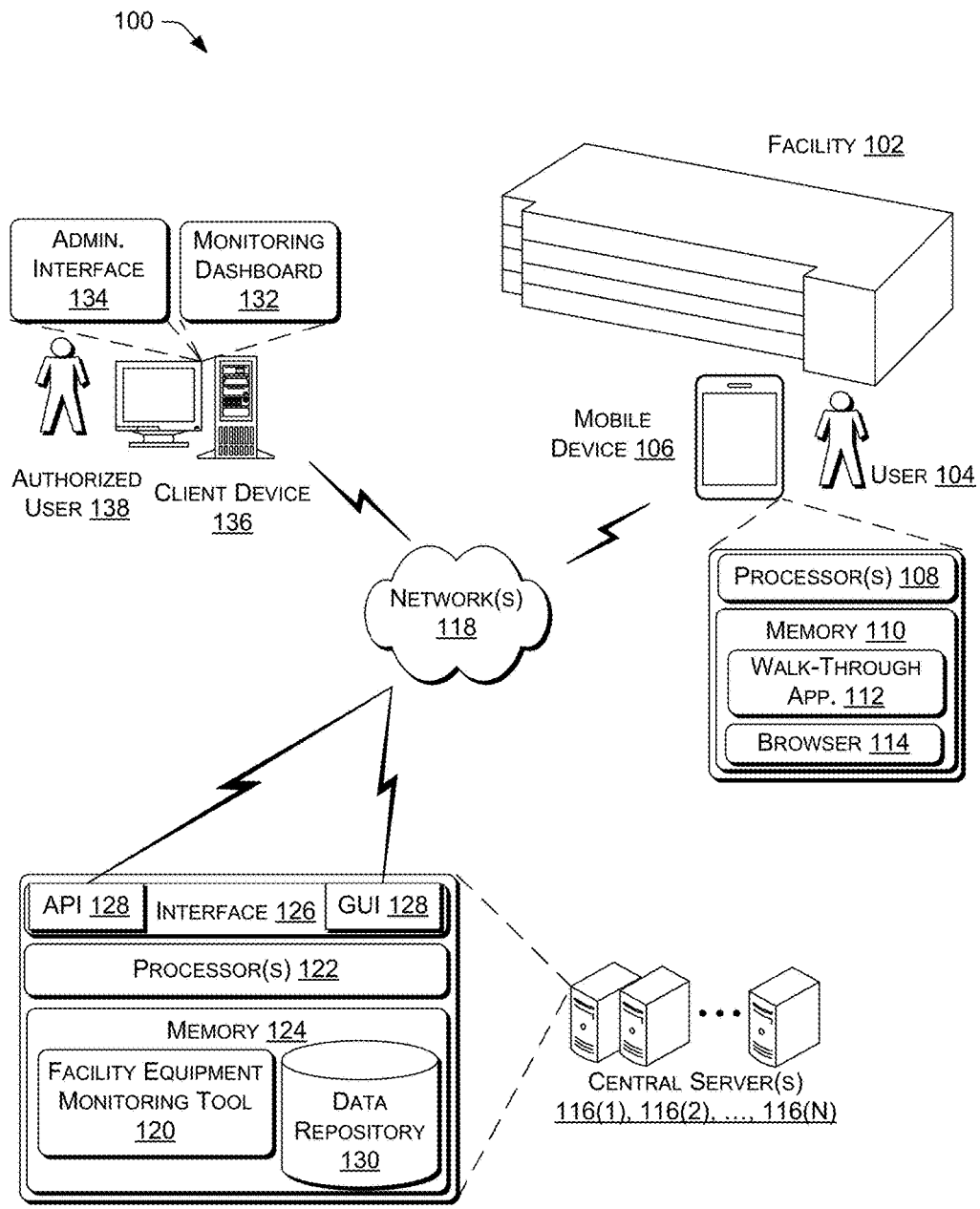
FIG. 1 illustrates an example system architecture for implementing a facility equipment monitoring tool for one or more facilities.

Embodiments of the present disclosure are directed to, among other things, techniques and systems for monitoring the availability of facility equipment. In some embodiments, a platform (i.e., a combination of software and hardware components) is provided to implement a facility equipment monitoring service. The platform may include a facility equipment monitoring tool with access to configuration information for one or more facilities. The platform allows for deployment of a mobile client application across a plurality of mobile devices to facilitate performance of walk-through inspections (i.e., rounds) of equipment within respective facilities.

Particularly, the mobile client application may be deployed on a mobile device that is to be carried by a user while conducting a walk-through inspection of equipment within a facility, such as during performance of a periodic walk-through inspection of a data center facility. The mobile device, when executing the application, is configured to capture machine-readable codes that are collocated with pieces of equipment along a walk-through inspection path within the facility. A code that is captured for an individual piece of equipment may be processed to issue an event that identifies and presents a list of questions for the user to answer via the mobile device. Based on the user-provided answers, the facility equipment monitoring tool is able to compare individual answers to information pertaining to the piece of equipment to assess whether alarm conditions are triggered with respect to any individual question/answer, and to assess a current state of the piece of equipment. In this manner, the facility equipment monitoring tool may present real-time equipment availability and other status indicators via a user interface displayed on the mobile device that are keyed off of the data collected via the mobile device during a walk-through inspection.

In some embodiments, a current state of a piece of equipment may be determined from one or more answers to the list of questions, the answers being input by the user via the mobile application. If the current state of a piece of equipment is determined to be in a defective or failing state, a communication may be automatically transmitted to request that personnel be dispatched to address the defective or failing piece of equipment. When network connectivity is available to the mobile device during a walk-through inspection, a dispatch request may be transmitted immediately in response to an alarm condition, allowing for fast response times to address equipment failures and provide continuous availability of the facility equipment.

As users complete walk-through inspections of a facility, the data collected during those walk-through inspections may be logged and uploaded to a central server system where the logged data may be stored in a central data repository. The platform may further provide a network-accessible monitoring dashboard that is available to authorized users for viewing real-time, and historical, data regarding the walk-through inspections performed at various facilities. The monitoring dashboard may reflect current equipment status to expose a real-time view of equipment availability in a given facility, and may further expose the dispatch request data to the viewer of the monitoring dashboard.

Administrators may access an administrative interface to add, modify, and/or delete configurations for a given facility and to store the updated configurations in the data repository of the central server system. As a result, mobile devices running the aforementioned application may "read in" current configurations before conducting a walk-through inspection of a given facility to provide updated information as to the various pieces of equipment in the facility, their locations and associated surveys for assessing current state of equipment, or any other pertinent information for facilitating walk-through inspections within a facility.

The techniques and systems disclosed herein provide improved consistency and accuracy of equipment availability through the use of a structured and directed workflow interface available to users conducting walk-through inspections within a facility. The directed workflow interface enables quick and streamlined collection and digitization of data during a walk-through inspection of equipment within a facility. This, in turn, allows for assessing equipment availability in real-time, providing reliable trouble reporting, and quickly detecting equipment defects so that the defects can be remedied at a rate that is currently not attainable. In this manner, outages and other availability issues may be avoided, or at least substantially mitigated as compared to current techniques for monitoring facility equipment availability. Moreover, the platform disclosed herein provides accountability for the users that conduct walk-through inspections by having them capture, with a mobile computing device, machine-readable codes during a walk-through inspection. This provides auditing functionality for supervisors of the users that conduct the walk-through inspections. The techniques described herein may be implemented in a number of ways. Example implementations are provided below with reference to the following figures.

FIG. 1 illustrates an example system architecture 100 for implementing a facility equipment monitoring tool for one or more facilities. The example system architecture 100 is merely one example of a suitable architecture, and the techniques and systems disclosed herein are not limited to the architecture 100 shown in FIG. 1.

The architecture 100 includes one or more facilities, represented by the facility 102. The facility 102 may represent any type of facility that can benefit from periodic inspection of facility equipment to ensure that the equipment is available and properly functioning for continued operation of the facility 102. Many of the examples presented herein describe the facility 102 as being in the form of a data center facility 102. Data centers typically house a multitude of servers and other specialized equipment (e.g., generators, chillers, uninterrupted power supplies (UPSs), etc.) that work together to provide various services. If any of the data center equipment were to fail, customers accessing the servers via client computing devices may experience outages. Data center operators want to make sure that the equipment of the data center facility 102 is operating and available at all times, when possible.

Although a data center facility 102 is one example of a suitable type of facility 102 that may benefit from the techniques and systems disclosed herein, the facility equipment monitoring platform described herein may benefit other types of facilities 102. For example, the platform may benefit a colocation facility, a fulfillment center, a material-handling facility, and so on, in a similar fashion to that described herein with respect to a data center facility 102. In fact, any facility 102 that is designed to have equipment that is to operate continuously with minimal interruption, or any secure facility 102 with monitoring equipment that is to be continuously operating may benefit from the techniques and systems disclosed herein.

FIG. 1 shows a user 104 associated with a mobile device 106 (sometimes referred to herein as a "client device" or "portable device"). The user 104 may represent an individual having physical access to the facility 102 and who is charged with conducting walk-through inspections within the facility 102. For example, the user 104 may be an employee, contractor, or agent of an operating entity in charge of operating and maintaining the facility 102. Such an operating entity may include, without limitation a business organization, governmental organization, non-profit organization, or another type of entity in charge of operating and maintaining the facility 102. As one illustrative example, the user 104 may represent a technician charged with conducting frequent (e.g., daily, twice daily, etc.) rounds or walk-through inspections of at least a portion of the facility 102 to inspect equipment (e.g., servers, generators, chillers, etc.) within the facility 102.

The mobile device 106 may be implemented as any number of mobile computing devices configured to be carried by the user 104 throughout the facility 102 during a walk-through inspection of equipment within the facility 102. The mobile device 106 may include, without limitation, a tablet computer, a laptop computer, a portable digital assistant (PDA), a mobile phone, a wearable computer (e.g., electronic/smart glasses, a smart watch, etc.), a digital camera, a mobile scanner, and/or similar mobile devices. The mobile device 106 may be equipped with one or more processors 108 and one or more forms of computer-readable memory 110 to store applications and data. Depending on the exact configuration and type of computing device, the memory 110 may be volatile (e.g., random access memory (RAM)), non-volatile (e.g., read only memory (ROM), flash memory, etc.), or some combination of the two.

In some embodiments, a walk-through application 112 may be stored in the memory 110 of the mobile device 106 and may be executed by the processor(s) 108 to facilitate performance of walk-through inspections within the facility 102. The mobile device 106 may additionally, or alternatively, store a browser application 114 configured to render pages served by one or more central servers 116(1), 116(2), . . . , 116(N) (collectively 116) on an associated display of the mobile device 106 for the purpose of facilitating performance of a walk-through inspection of the facility 102. In some embodiments, the browser application 114 may receive content presented in web page format based on hyper text markup language (HTML) code. At least some of the user interface elements presented by the walk-through application 112 and/or the browser 114 may be "actionable" in that the elements in a user interface (UI) may be responsive to user input. Any suitable scripting language (e.g., JavaScript, Jscript, European Computer Manufacturers Association script (ECMAScript), etc.) or program (e.g., Java applet) may be used for either or both of the walk-through application 112 and the browser application 114 such that content presented via a display of the mobile device 106 may be coded with event-driven programming languages to register event handlers/listeners, such as event handlers on element nodes inside a document object model (DOM) tree.

The mobile device 106 may be configured to access the central server(s) 116 via a network(s) 118. The network(s) 118 is representative of many different types of networks, such as public or private networks, wide area networks, such as the Internet, or local area networks, mobile telephone networks, wired or wireless networks, or a combination of such networks.

The central server(s) 116 may be arranged as a server farm or a server cluster, or as a single server to implement a facility equipment monitoring tool 120, which may provide various services and functionality across the platform. Other server architectures may also be used to implement the facility equipment monitoring tool 120. As shown in FIG. 1, the central server(s) 116 are equipped with one or more processors 122 and one or more forms of computer-readable memory 124. Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, compact disc read-only memories (CD-ROMs), digital video discs (DVDs), ROMs, RAMs, erasable programmable read-only memories (EPROMs), electrically erasable programmable read-only memories (EEPROMs), flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be by an Internet download.

The computer-readable memory 124 may be used to store any number of functional, or executable, components, such as programs and program modules that are executable on the processor(s) 122 to be run as software. Each component stored in the computer-readable memory 124 may comprise computer-executable instructions that, when executed, cause the one or more processors 122 to perform acts and to implement techniques described herein. Each component may be in the form of data structures, program modules, or other data.

The facility equipment monitoring tool 120 may be stored in the memory 124 and may be executed by the processor(s) 122 to provide services and functionality that are exposed to other devices, such as the mobile device 106, through various forms of network-based interfaces, which in FIG. 1 are represented as being implemented by an interface 126. The interface 126 may expose various application programming interfaces (APIs) 128 that may be programmatically accessed by remote or external devices and/or applications, such as the mobile device 106 and/or the associated walk-through application 112. Thus, the APIs 128 allow for programmatic access of the facility equipment monitoring tool 120 via API calls specifying desired actions or queries.

The interface 126 may additionally, or alternatively, expose a graphical user interface (GUI) 128 for interactive access to the facility equipment monitoring tool 120 by other devices capable of rendering a GUI 128, such as the mobile device 106 executing the browser application 114. For example, the GUI 128 may cause a network-accessible site to be exposed to the user 104 via the browser 114 of the mobile device 106 so that the user 104 may be provided with a browser-based, directed workflow interface to conduct walk-through inspections of the facility 102.

The central server(s) 116 may therefore provide a hosted network API service (e.g., a web API service) that is afforded access to data stored within one or more data repositories, which are represented by the data repository 130. The data repository 130 may comprise one or more data structures for storage and retrieval of data utilized for facility equipment monitoring. The data stored in the data repository 130 may be any suitable type of data, including, without limitation, data pertaining to individual pieces of equipment in the facility 102, locations of the equipment within the facility 102, identification codes for the equipment, conditions indicative of whether the equipment is in an operational verses a failing/defective state, survey questions for assessing the current state of equipment, equipment-related content (e.g., documents, videos, audio, etc.), and so on. The central server(s) 116 may provide various types of hosted network API services to users, including, without limitation, a directed workflow interface for conducting walk-through inspections of the facility 102, a monitoring dashboard 132 for viewing statistics and real-time availability of the equipment in the facility 102, a service for accessing equipment-related content, and/or an administrative interface 134 to modify configurations for the facility 102, among other possible services.

The monitoring dashboard 132 and the administrative interface 134 may be accessed via a client computing device 136 associated with an authorized user 138. The authorized user 138 may be any entity that is authorized (e.g., has proper credentials, such as a user name and password) to access restricted interfaces provided by the facility equipment monitoring tool 120. As such, the authorized user 138 may invoke the monitoring dashboard 132 via the client device 136 in order to view real-time, and historical, data (e.g., dispatch request data) regarding the walk-through inspections that have been performed at various facilities, such as the facility 102. The monitoring dashboard 132 may also reflect current equipment status to expose a real-time view of equipment availability in a given facility 102.

The authorized user 138 may, in some instances, represent an administrator who can access the administrative interface 134 to add, modify, and/or delete configurations for a given facility 102 and store the updated configurations in the data repository 130 of the central server system 116. As a result, a mobile device 106 running the walk-through application 112 may "read in" current configurations from the data repository 130 before conducting a walk-through inspection of a given facility 102 so that the walk-through application 112 may utilize the updated configurations during the walk-through inspection. Such modifiable configurations may include the various pieces of equipment in the facility 102, the locations of the individual pieces of equipment, survey questionnaires for individual pieces of equipment for assessing a current state (e.g., operational state verses defective or failing state) of the equipment, and other pertinent information for facilitating walk-through inspections within a facility 102.

An entity operating the central server(s) 116 may be the same entity as, or a different entity than, an entity that operates the facility 102. For example, a facility operator may pay for the services provided by a hosting entity of the facility equipment monitoring tool 120, which may be provided via the central server(s) 116. This may be suitable when the facility operator does not have the expertise to build and/or operate the facility equipment monitoring tool 120 and the associated platform. Moreover, the central server(s) 116 may be physically remote from the facility 102 or located on the same premises as the facility 102.

Figure 2:
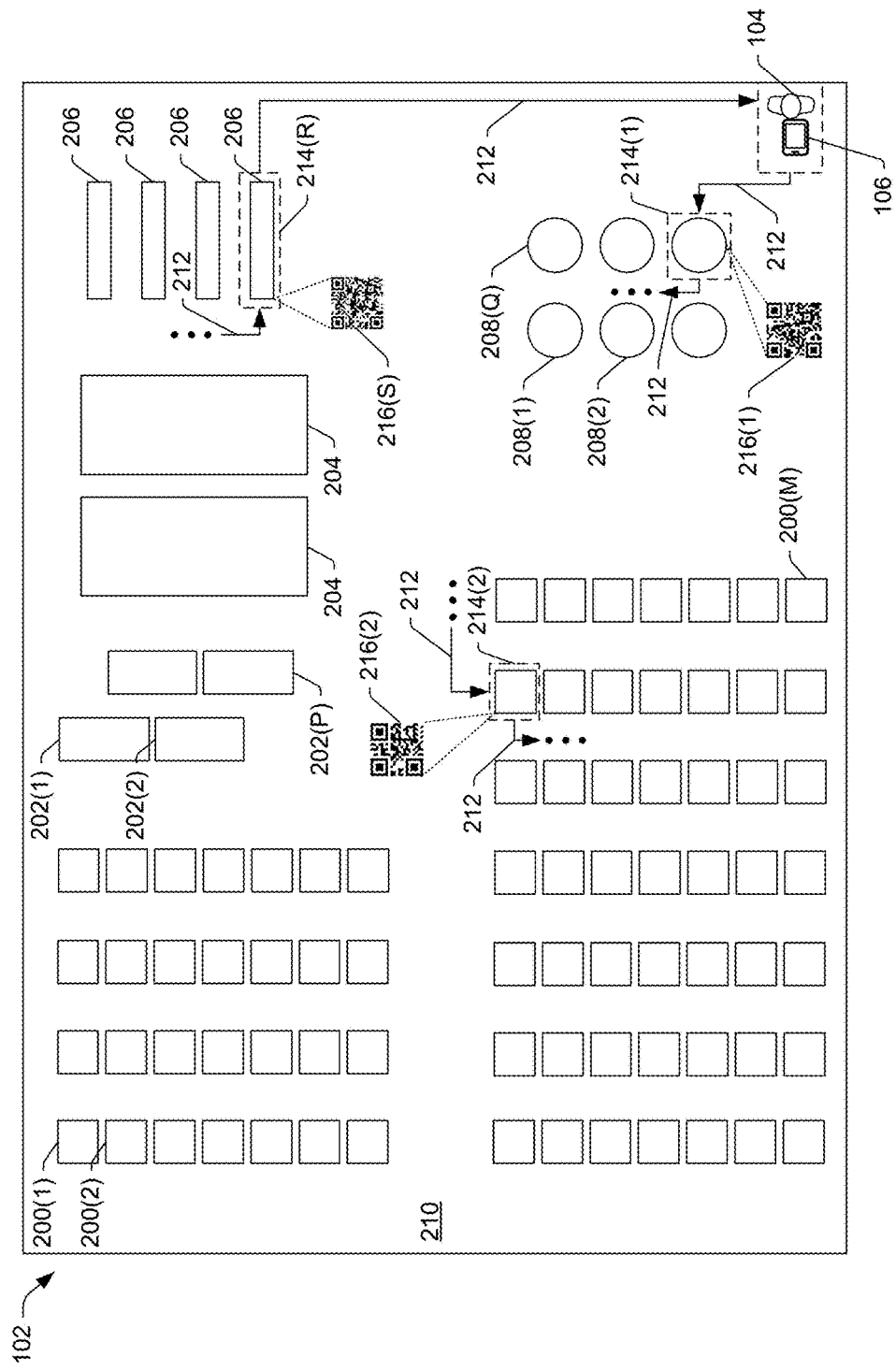
FIG. 2 illustrates a top plan view of an example facility where users conduct walk-through inspections of the equipment within the facility.

FIG. 2 illustrates a top plan view of an example facility 102 that may represent the facility 102 of FIG. 1. In this example, the facility 102 may comprise a data center facility 102 housing equipment therein that is to be inspected by users that conduct frequent rounds of portions of the facility 102. The equipment that is to be inspected in the example data center facility 102 of FIG. 2 may include various types of equipment, including, without limitation, one or more servers 200(1), 200(2), . . . , 200(M) (collectively 200), one or more storage systems 202(1), 202(2), . . . , 202(P) (collectively 202), one or more cooling towers 204, one or more generators 206, one or more chillers 208(1), 208(2), . . . , 208(Q) (collectively 208), and so on. It is to be appreciated that, depending on the type of facility, the equipment to be inspected may comprise any type of equipment that is operational to some degree. For example, a door of the facility 102 may be considered to be a piece of equipment that can be inspected to ensure that the door is operational and available (e.g., whether the door is locking properly, that sensors associated with the door are calibrated and positioned correctly, etc.). Thus, "equipment," as used herein, may be any type of equipment of a facility 102 that can be monitored to ensure that the equipment is operational.

FIG. 2 further illustrates the user 104 within the facility 102 who may be charged with conducting frequent walk-through inspections, or rounds, to collect data for the various pieces of equipment 200-208. An exemplary purpose for collecting the data during the walk-through inspections is to assess a current state of the equipment 200-208, such as whether any given piece of equipment is in an available/operational state (i.e., operating within specification), or whether it is otherwise in a defective or failing state (e.g., above a temperature threshold, operating out of specification, etc.).

The user 104 is shown to be carrying the mobile device 106 that was introduced in FIG. 1. The mobile device 106 is configured to facilitate performance of walk-through inspections by executing thereon the walk-through application 112, and/or accessing the facility equipment monitoring tool 120 over the network 118 via another program, such as the browser 114.

The facility 102 may be partitioned into zones for performing respective walk-through inspections in each zone of the facility 102. FIG. 2 may itself represent a zone 210, such as a floor, a room, or anything that may be definable as an area of the facility 102. The facility 102 may be comprised of a single zone, or multiple zones depending on the layout of the facility 102, the size of the facility 102, and/or other factors pertaining to the facility 102. It is to be appreciated that a zone 210 may be of variable dimensions and/or arbitrary geometry, and in particular may represent a two-dimensional (2D) area (e.g., a floor) or a three-dimensional (3D) space. Furthermore, a zone 210 may be entirely enclosed in a building, or alternatively, some or all of a zone 210 may be located outdoors, within a vehicle (e.g., a cargo ship), or otherwise unconstrained by any fixed structure.

Moreover, in some embodiments, the zone 210 may include multiple portions that are physically separated from one another, including but not limited to separate floors, rooms, buildings, and/or portions divided in any other suitable manner. In some embodiments, stairs, ramps, and/or conveyance equipment such as vertical or horizontal conveyors, trucks, ferries, gondolas, escalators, elevators, and the like, may be included in a zone 210 to allow users, such as the user 104, to access the various separate portions of the zone 210.

Within the zone 210, a path 212 (sometimes referred to herein as a "track") may be designated for the user 104 to follow when conducting a walk-through inspection. It is to be appreciated that the path 212 may represent a connection of "nodes" to be visited in a particular order, rather than an actual route that the user 104 is to follow on the floor of the facility 102. That is, the user 102 may take any physical route between to sequential stops along the path 212, so long as the user 102 visits each stop in a sequential manner outlined by the path 212. Accordingly, the path 212 may comprise a number of stops 214(1), 214(2), . . . , 214(R) (collectively 214) along the path 212 that are to be visited sequentially during a given walk-through inspection. For example, a particular walk-through inspection may specify that the user 104 is to initially visit stop 214(1) first, and subsequently visit stop 214(2), and subsequently visit stop 214(R), perhaps with one or more other stops in between the enumerated stops shown in FIG. 2.

FIG. 2 further illustrates that the pieces of equipment 200-208 may be individually associated with unique machine-readable codes 216(1), 216(2), . . . , 216(S) (collectively 216) that identify each piece of equipment 200-208 to be inspected. The codes 216 may be associated with the pieces of equipment by virtue of adhering physical labels with the codes 216 onto the equipment itself, providing labels with the codes at a location near the equipment, or otherwise collocating the physical code 216 with the respective piece of equipment. The machine-readable codes 216 may represent location-specific identifiers, and may take any suitable form, including, but not limited to, multi-dimensional optical codes (e.g., quick response (QR) codes), bar codes (e.g., universal product code (UPC) bar codes), alphanumeric codes, smart card chips, near-field communication (NFC) chips, radio frequency identification (RFID) transmitters, or any other similar type of machine-readable code 216 that is readable by the mobile device 106. FIG. 2 shows the machine-readable codes 216 in the form of QR codes that may be captured by an optical sensor (e.g., a camera) of the mobile device 106 during a walk-through inspection. The code capture causes an event to be issued so that a series of questions is identified and presented on the mobile device 106 for assessing the current state of the particular piece of equipment.

Figure 3:
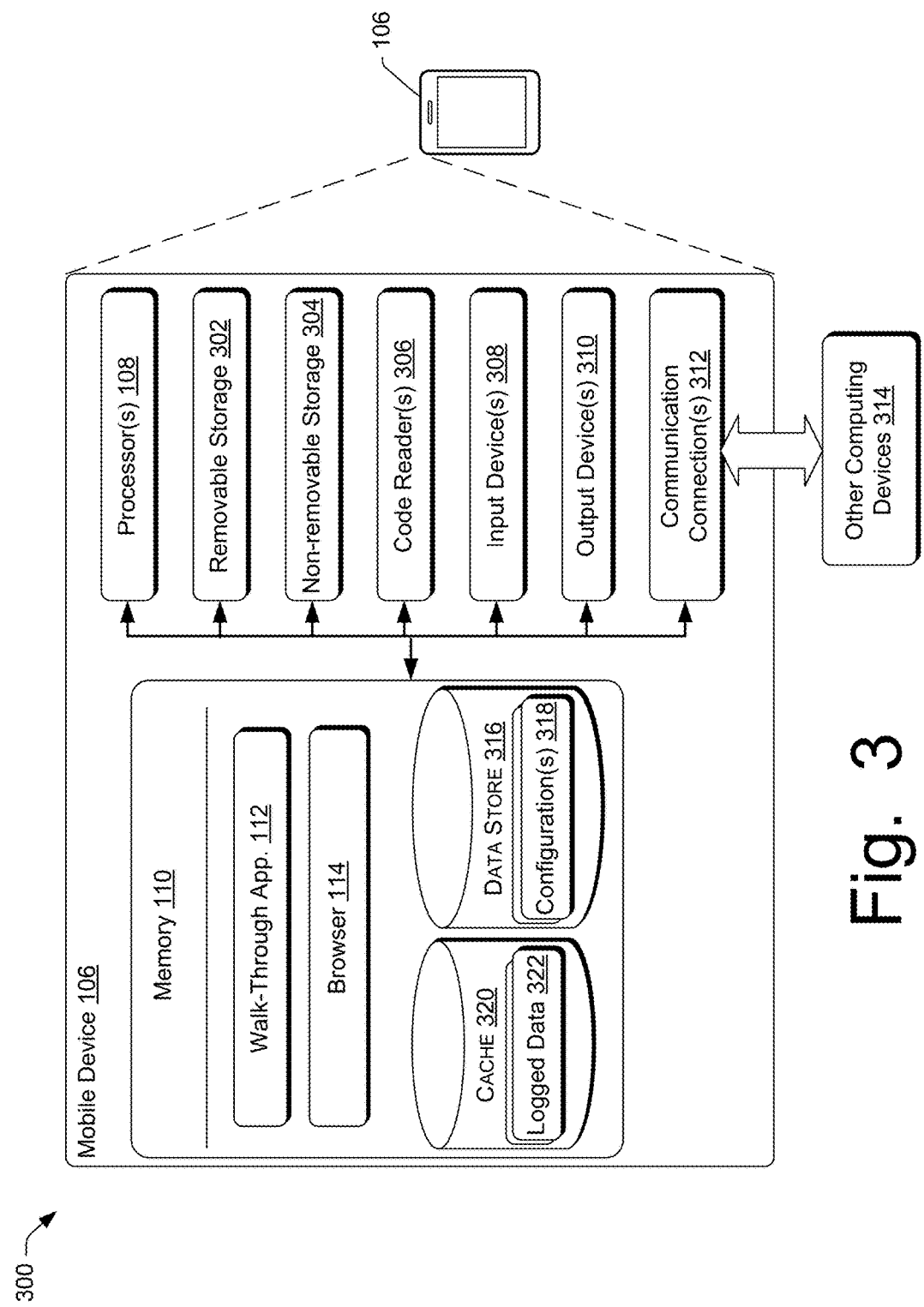
FIG. 3 illustrates an example computing system comprising a mobile device configured to execute a program for conducting walk-through inspections of equipment within a facility.

FIG. 3 illustrates an example computing system 300 comprising the mobile device 106 of FIG. 1, which may include the processor(s) 108, the memory 110, the walk-through application 112, and the browser 114 introduced with reference to FIG. 1. The system 300 is merely one example system to implement the techniques described herein such that the techniques described herein are not limited to performance using the system of FIG. 3.

In addition to the memory 110, the mobile device 102 may also include additional data storage devices (removable and/or non-removable) such as, for example, magnetic disks, optical disks, or tape. Such additional storage is illustrated in FIG. 3 by removable storage 302 and non-removable storage 304. The memory 110, removable storage 302 and non-removable storage 304 are all examples of non-transitory machine-readable storage media, as described above. In some embodiments, any or all of the memory 110, removable storage 302 and non-removable storage 304 may store programming instructions, data structures, program modules and other data, which, when executed by the processor(s) 108, implement some or all of the processes described herein.

The mobile device 106 may also include one or more code readers 306 that are configured to capture one or more types of machine-readable codes, such as a QR code. The code reader(s) 306 may include, without limitation, an optical sensor, such as an image capture device (e.g., a camera, infrared camera, etc.), a scanner (e.g., UPC bar code reader), an RFID receiver, smart card receiver, or any other similar type of code reader 306 that is configured to read the machine-readable codes 216 associated with the equipment in the facility 102.

The mobile device 106 may also include one or more input devices 308 such as a keyboard, pointing devices (e.g., mouse, touch pad, joystick, etc.), a pen, stylus, or wand, a touch screen (e.g., capacitive, resistive, infrared, surface acoustic wave (SAW), optical), a camera (e.g., 3D sensor), a proximity sensor, a microphone, etc., through which a user (e.g., the user 104) may enter commands and information into the mobile device 106.

The mobile device 106 may also include output device(s) 310, such as a display, one or more speakers, a printer, or any other suitable output device coupled communicatively to the processor(s) 108. The output device(s) 310 may generally be configured to provide output to a user (e.g., the user 104) of the mobile device 106.

The mobile device 106 may be configured to operate in a networked environment (online mode) and in a non-networked environment (offline mode). As such, the mobile device 106 may further include communication connections 312 that allow the device to communicate with the other computing devices 314, such as central server(s) 116, when operating in the "online mode." The communication connections 312 are usable to transmit and/or receive data in a wired or wireless transmission mode.

The mobile device 106 may further include a data store 316 to store, among other things, configurations 318 that pertain to one or more facilities, such as the facility 102. The configurations 318 may be "read-in" by, imported to, or otherwise synched with, the mobile device 106 when the walk-through application 112 is launched so that the current and up-to-date configurations 318 associated with the facility 102 may be utilized by the walk-through application 112 during a walk-through inspection.

The mobile device 106 may further include cache 320 to store logged data 322, which represents the data collected by the mobile device 106 during a walk-through inspection via the walk-through application 112. The logged data 322 may include machine-readable codes 216 that have been captured by the code reader(s) 306 during a walk-through inspection, times (i.e., date and time) at which the machine-readable codes 216 were captured, answers to survey questions that were provided by the user 104, and other pertinent information collected during a walk-through inspection. The logged data 322 may be uploaded in real-time (i.e., as it is captured/collected at the mobile device 106) and/or held for a period of time in the cache 320, which may maintain the logged data 322 until it can be uploaded to, or otherwise synched with, the central server(s) 116.

Figure 4:
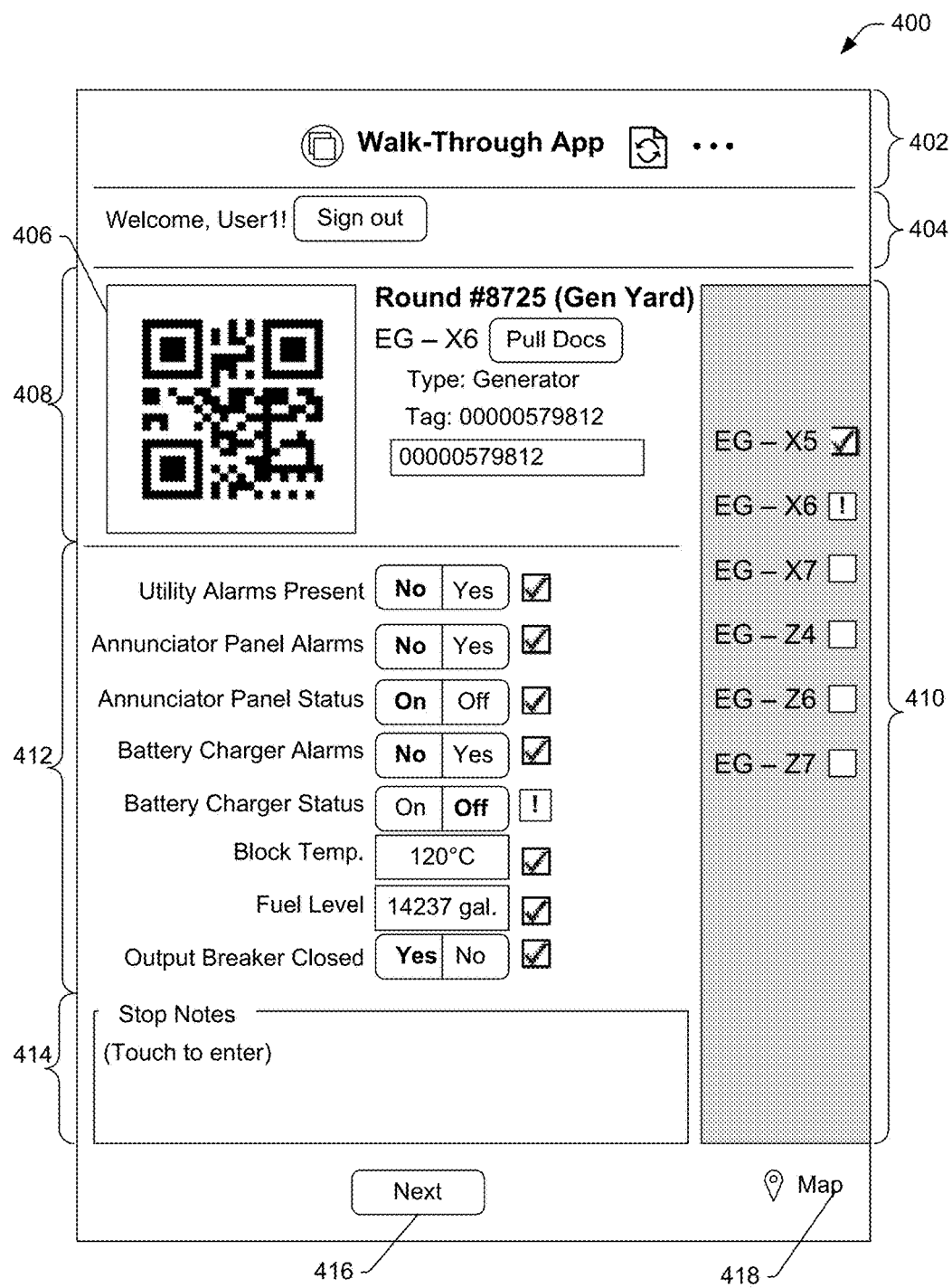
FIG. 4 illustrates a screen rendering of an example user interface that may be presented on a mobile device during a walk-through inspection of equipment within a facility.

FIG. 4 illustrates a screen rendering of an example user interface (UI) 400 that may be presented on the mobile device 106 during a walk-through inspection of equipment within the facility 102. The UI 400 may comprise a graphical user interface (GUI). The UI 400 may be stored and executed locally on the mobile device 106 as part of the walk-through application 112. The UI 400 may be a browser (e.g., a web browser) that can format text based on HTML code. The UI 400 may be accessed over the network 118 and presented, displayed, or otherwise communicated to the mobile device 106 via the interface 126.

The UI 400 may include a navigation bar or region 402 where navigation elements or controls are displayed, such as a refresh element, a page navigation element, a menu element, and the like. The UI 400 may further include a user account indicator and sign out button in a region 404 of the UI 400 to indicate that the user 104 (e.g., "User1") is logged into the walk-through application 112.

The UI 400 may further include a code capture window 406 that may be embedded in the application and presented as a live field of view of the code reader 306 (e.g., a live field of view of a camera) before a moment in time when a code 216 is captured, and may present the captured code 216 after operation of the code reader 306. For example, the code reader 306 may be a camera, and the machine-readable code 216 may be a QR code, as shown in the code capture window 406 of FIG. 4 after the QR code has been captured by a camera of the mobile device 106.

A region 408 of the UI 400 may include the code capture window 406 and additional information pertaining to a particular walk-through inspection and a piece of equipment at a stop 214 of the walk-through inspection. FIG. 4 shows an example where the user 104 is currently conducting a walk-through inspection identified by "Round #8725 (Gen Yard)" to denote that the walk-through inspection is for the generator yard of the facility 102 and corresponds to a specific path 212 that the user 104 is to follow. The region 408 may also detail a piece of equipment identified by "EG-X6", and a type of equipment (e.g., "Generator"), an alpha-numeric code or tag corresponding to the captured code 216 in the code capture window 406, and a button that, upon selection, surfaces content (e.g., documents) pertaining to the specific piece of equipment or the general equipment type. For example, if the user 104 desired to view a standard operating procedure document regarding the EG-X6 generator, the user 104 can select, via the input device 308, the "Pull Docs" button to open, for example, a folder of documents available for, and related to, generators, and perhaps the specific piece of equipment. The files of related content may be downloaded to the mobile device 106 and stored in the data store 316 before a walk-through inspection is initiated so that the content is available in an offline mode, or the content may be downloaded over the network 118 in response to selecting the "Pull Docs" button.

A region 410 of the UI 400 may present the pieces of equipment located along the walk-through inspection. The order of the list of equipment in the region 410 may correspond to the path 212 that the user 104 is to visit each piece of equipment. In this manner, after a given piece of equipment is inspected, the user 104 may know which piece of equipment to visit next by going down the list to the next piece of equipment. Each piece of equipment listed in the region 410 may be associated with a visual indicator (e.g., boxes, colors, stylized text, etc.) to visually indicate which of the pieces of equipment have been inspected and an indication of the current state of the piece of equipment. In the example of FIG. 4, the user 104 has already inspected the piece of equipment labeled "EG-X5" (e.g., a generator), and the "check box" visual indicator is an exemplary means of indicating that the EG-X5 piece of equipment has been inspected and is operating within specification or is otherwise in a ready/available state. Other types of visual indicators may be utilized in addition to, or in lieu of, the check box indicator, such as a colored symbol or colored text (e.g., a "green" colored box may indicate an available state, while a "red" colored box may indicate a defective or failing state, and a white colored box may indicate that the piece of equipment has yet to be inspected for the current walk-through inspection). The UI 400, in this example, further indicates that the EG-X6 generator that has just been inspected is currently in a defective or failing state, as indicated by the "exclamation marked box" in the region 410. Any suitable visual indicator and/or audible (e.g., a sound) or tactile (e.g., vibration) indicator may be utilized to convey a defective or failing state for a given piece of equipment. Moreover, the visual and/or audible and/or tactile indicator may be invoked in response to an individual answer received via user input. For example, as soon as the user 104 selects that the battery charger status is "Off," a visual indicator next to the EG-X6 label in region 410 may be presented to indicate, in real-time, to the user 104 that the piece of equipment is in a defective state. As will be described in more detail below, a dispatch request may also be transmitted in response to a selection of an individual answer, such as at substantially the same time as the visual indicator is presented in region 410.

When the user 104 captures a machine-readable code 216 for a given piece of equipment (in this case the generator labeled EG-X6), an event may be issued that causes a list of questions (or survey) to be presented in a region 412 of the UI 400. The user 104 may answer the individual questions as part of the inspection process. The user 104 may provide input to the input device(s) 308, such as a touch screen, to select from Boolean options (e.g., "Yes/No", "On/Off", etc.), or to enter values (e.g., temperature readings, voltage readings, etc.) into fields. FIG. 4 shows an example list of questions and possible answers that may be provided by the user 104 via the input device(s) 308 (e.g., touch interaction with the touch screen). Some of the answers shown in FIG. 4 are selectable Boolean options, while two of the answers shown in FIG. 4 comprise values entered into respective fields by the user 104. Such values entered into free-form fields may represent measurements like block temperature, fuel level, etc., so that the values may be compared to conditions such as threshold values that may indicate when a certain value triggers an alarm condition because it is above or below the predetermined threshold. The region 412 may further display visual indicators (e.g., colors, check boxes, symbols, stylized text, etc.) that indicate whether any individual answer provided by the user 104 triggers an alarm condition. That is, the display of the visual indicators in association with the answers may occur in real-time, as the answers are provided by the user 104 to provide real-time feedback to the user 104 as to an alarm condition. The options that are available for inputting answers may be arranged such that the options on the left of the list are answers that would not trigger an alarm condition, and answers on the right would trigger an alarm condition, for example. This may allow the user 104 to more quickly identify the answer that triggers an alarm condition.

In some embodiments, the list of questions presented in the region 412 comprises a dynamic list of questions that utilizes a decision tree to choose one or more follow up questions based on receipt of particular answers to particular questions. That is, the user 104 may provide user input indicating an answer to an individual question, and logic of the application 112 may then determine whether a follow up question is to be presented based on the received answer. If a follow up question is identified in the decision tree, the follow up question may be revealed upon the user input providing the answer to the original question, such that the list of questions dynamically changes as answers are provided by the user 104.

The answers provided by the user 104 may be compared to the configurations 318 previously downloaded to the mobile device 106 in order to determine whether an alarm condition is triggered by any individual answer. For example, the configurations 318 may specify that the EG-X6 generator is to have its battery charger status as "On" in order to be operating within specification or otherwise to be designated in an available state. The example of FIG. 4 shows that the user 104 has provided an answer that the battery charger status is currently "Off." This answer, when compared to the configurations 318, causes logic of the walk-through application 112 to determine that this particular answer triggers an alarm condition.

A notes region 414 may be provided for the user 104 to enter manual notes about his/her inspection of the piece of equipment he/she is currently inspecting. The UI 400 may further include a button 414 to save the answers to the survey questions and to proceed to the next stop 214 of the walk-through inspection. The UI 400 may also present a selectable "map" element 418 that, upon selection, causes display in the UI 400, or in a separate UI, of a map view of the current walk-through inspection path 212 overlaid on the floor plan of the facility 102. The map view may indicate where the mobile device 106 is currently located by use of a global positioning system (GPS) receiver of the mobile device 106 or another suitable localization mechanism (e.g., wireless signal strength and known location of wireless access points).

Figure 5:
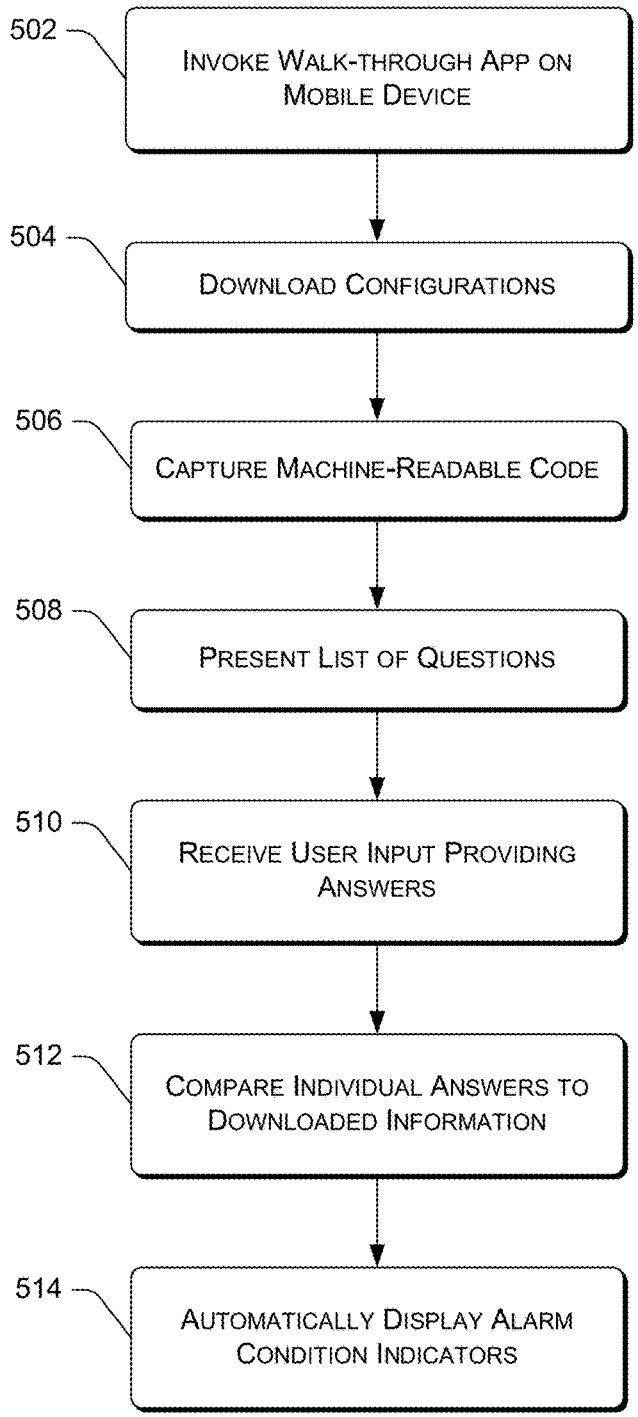
FIG. 5 is a flow diagram of an illustrative process for displaying real-time status indicators via a mobile application used for conducting walk-through inspections.

FIG. 5 is a flow diagram of an illustrative process 500 for displaying real-time status indicators via a UI, such as the UI 400 of FIG. 4, of an application 112 executing on a mobile device 106, the application 112 for conducting a walk-through inspection of equipment within a facility 102. The processes disclosed herein are illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

For discussion purposes, the process 500 is described with reference to the architecture 100 of FIG. 1, the diagram of FIG. 2, and the computing system 300 of FIG. 3. At 502, the walk-through application 112 may be invoked or opened on the mobile device 106. The user 104 may invoke the application 112 by providing user input via the input device 308 when the user 104 is ready to conduct a walk-through inspection of the equipment within the facility 102. Alternatively, the step 502 may involve invoking or opening the browser application 114 to access a web-hosted walk-through application 112 or a site provided by the central server(s) 116 to conduct a walk-through inspection via a browser (e.g., a web browser). The user 104 may also sign into the walk-through application 112 so the user 104 can be identified for purposes of associating collected data with the user 104.

At 504, the mobile device 106, via the communication connection(s) 312, may download, from the central server(s) 116, configurations 318 for the walk-through application 112 that may be utilized during the walk-through inspection. For example, the configurations 318 may include up-to-date paths 212, zones 210, stops 214, and/or survey questions pertaining to walk-through inspections, as well as the pieces of equipment at those stops 214, the codes 216 associated with the equipment, documents related to the equipment, and so on. When any of this information is modified by administrators, it is stored in the data store 130 so that the central server(s) 116 maintains updated configurations 318, which can be "read-in" by the mobile device 106 at 504 before conducting a walk-through inspection to ensure that the most up-to-date configurations 318 are utilized by the walk-through application 112.

In some embodiments, the user 104 may specify a region where the facility 102 is located, such as when the facility 102 is one of many facilities that are disparately located in different parts of the world, and the user 104 may also select the particular facility 102 where the user 104 is about to conduct the walk-through inspection. The user 104 may further be presented with a plurality of possible walk-through selections to choose from that may be catered toward inspections in different zones of the facility 102 or different paths 212 to inspect particular equipment types. In some embodiments, an ordered list of stops 214, and/or a map showing the ordered stops 214 along a selected walk-through inspection path 212 may be presented to the user 104 via a UI of the walk-through application 112 so that the user 104 may be further aided by viewing the route he/she is to follow for the walk-through inspection.

At 506, when the user 104 arrives at a stop 214 where a piece of equipment to be inspected, the user 104 may operate the code reader 306 of the mobile device 106 to capture a machine-readable code 216 that is collocated with the piece of equipment. For example, the code 216 may be in the form of a label adhered to a housing of the piece of equipment. As noted above, any suitable type of code 216 and code reader 306 may be utilized at 506 to capture the code 216. For example, a camera of the mobile device 106 may be operated to capture a QR code. The code 216 may be processed (e.g., digitized) to fire an event that causes the application 112 to search for, and identify, a list of questions associated with the captured code 216. The application 112 may search the downloaded configurations 318 for the corresponding list of questions.

At 508, the walk-through application 112 may cause an identified list of questions to be presented via a UI, such as the list of questions shown in the region 412 of the UI 400. The list of questions serves the purpose of assessing a current state of the piece of equipment corresponding to the code 216 captured at 506. At 510, the user 104 may provide input (e.g., touch interaction) via the input device(s) 308 (e.g., a touch screen) to indicate answers to individual ones of the questions in the list presented at 508.

At 512, logic of the walk-through application 112 may compare individual answers received by user input to conditions included in the configurations 318 that are associated with the piece of equipment in order to determine whether the answer triggers an alarm condition. For example, the conditions may be included in the configurations 318 that were downloaded at 504. Example types of conditions that may trigger the alarm condition include, without limitation, thresholds (e.g., temperature thresholds, battery level thresholds, etc.), a failing value for a selectable option for answering the questions (e.g., a "No" answer to a Boolean question where "No" is specified in the conditions as a failing value, and "Yes" is specified as a non-failing value), and other suitable conditions.

At 514, for any individual questions that trigger the alarm condition, the walk-through application 112 may automatically display, in real-time via the UI 400, visual indicators (e.g., colors, symbols, stylized text, etc.) in association with those answers to visually indicate which answers have triggered the alarm condition. Because the configurations 318 may be downloaded before the walk-through inspection when the mobile device 106 has access to a network connection, the mobile device 106, when necessary, may operate in an "offline mode" during the walk-through inspection. Nevertheless, the downloaded configurations 318 may allow for near instantaneous and real-time status indicators to be displayed via a UI (e.g., the UI 400) by comparing the received answers to the conditions included in the configurations 318 for a given piece of equipment. In scenarios where a network connection is available to the mobile device 106, the mobile device 106 may operate in an "online mode" such that received answers may be compared with either local (i.e., downloaded information) or information stored in the cloud within the data repository 130. Either way, at 514, a near instantaneous display of a visual indicator may be presented via the UI 400 in association with individual answers that trigger an alarm condition so that the user 104 may be alerted to the alarm condition as soon as it is detected based on the comparison at 512.

Figure 6:
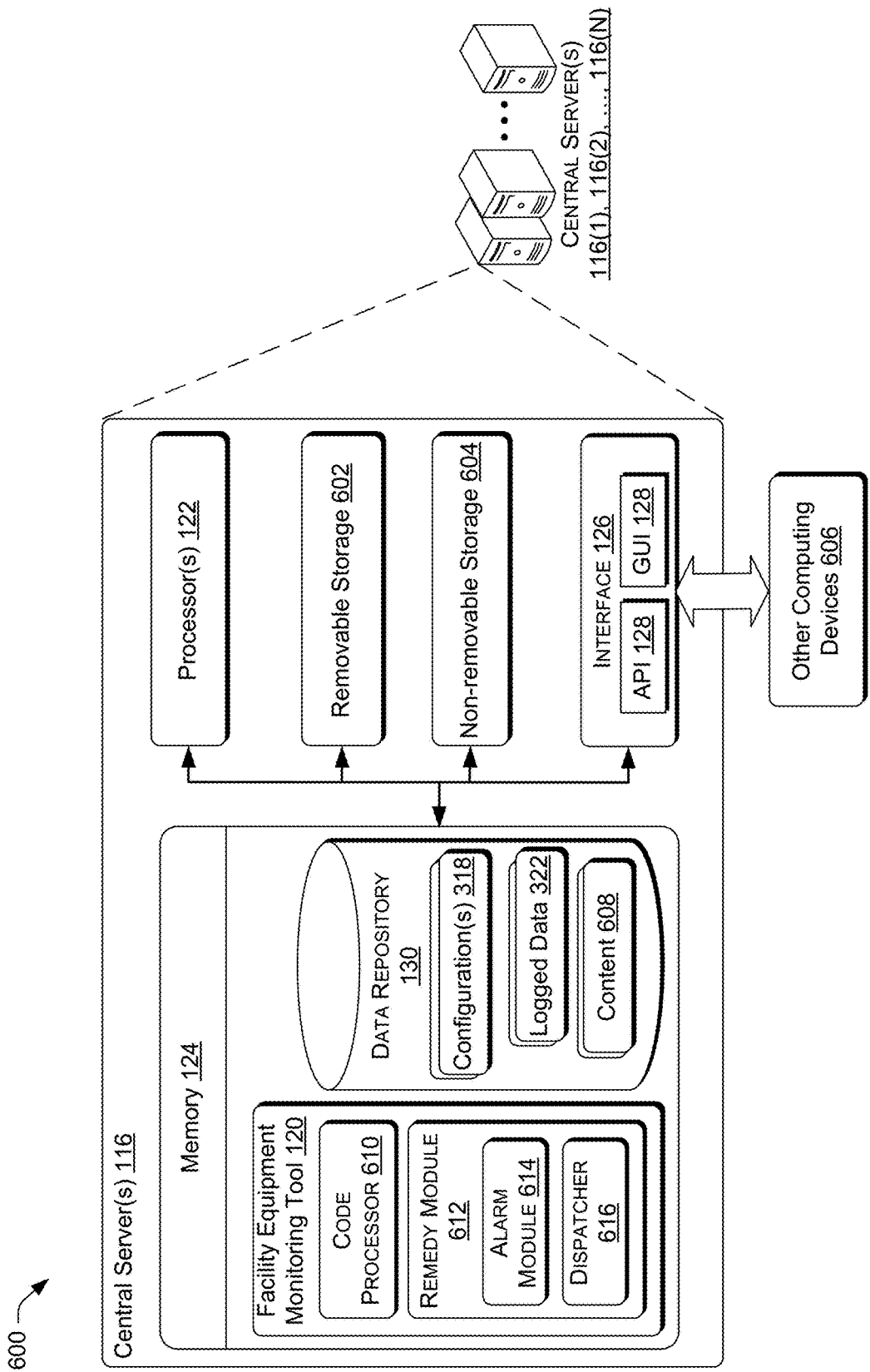
FIG. 6 illustrates an example computing system comprising one or more central servers configured to implement a facility equipment monitoring tool and associated platform.

FIG. 6 illustrates an example computing system 600 comprising the central server(s) 116 configured to implement the facility equipment monitoring tool 120 introduced with reference to FIG. 1. The system 600 may include the processor(s) 122, the memory 124, the facility equipment monitoring tool 120, the data repository 130, and the interface 126 (including the APIs 128 and the GUIs 128) introduced with reference to FIG. 1. The system 600 is merely one example system to implement the techniques described herein such that the techniques described herein are not limited to performance using the system of FIG. 6.

In addition to the memory 124, the central server(s) 116 may also include additional data storage devices (removable and/or non-removable) such as, for example, magnetic disks, optical disks, or tape. Such additional storage is illustrated in FIG. 6 by removable storage 602 and non-removable storage 604. The memory 124, removable storage 602 and non-removable storage 604 are all examples of non-transitory machine-readable storage media, as described above. In some embodiments, any or all of the memory 124, removable storage 602 and non-removable storage 604 may store programming instructions, data structures, program modules and other data, which, when executed by the processor(s) 122, implement some or all of the processes described herein.

Moreover, FIG. 6 illustrates that the data repository 130 contains the configurations 318 and the logged data 322 discussed with reference to FIG. 3. The configurations 318 may be stored in the data repository 130 and updated periodically in response to administrators modifying the configurations 318, such as modifying zones 210, paths 212, stops 214, survey questions, and/or conditions indicative of a state of a piece of equipment, and so on. These configurations 318 are synched with the mobile devices 106 when the walk-through applications 112 deployed thereon is executed prior to conducting a walk-through inspection of equipment within a facility 102. The data repository 130 is shown to further contain content 608 that may include documents, video, audio, or any other suitable content that is related to the equipment in the facility 102 so that a user 104 conducting a walk-through inspection may download or otherwise surface the content 608. In order to download the content 608 associated with a specific piece of equipment, the user 104 may capture the machine-readable code 216 that is collocated with a specific piece of equipment, and the code 216 may be transmitted to the central server(s) 116 over the network to obtain the content 608 associated with the transmitted code 216. In this manner, content 608 may be downloaded to the mobile device 106 or otherwise presented on the mobile device 106 using the browser 114 of the mobile device 106.

The data repository 130 is also shown as containing logged data 322 that may have been synched from data transferred over the network 118 to the central server(s) 116 from one or more mobile devices 106. The logged data 322 may include data collected during a walk-through inspection (e.g., captured codes 216, timestamps associated with the captured codes 216, answers to survey questions, notes provided by the user 104, etc.), among other data.

FIG. 6 further illustrates that the facility equipment monitoring tool 120 may include a code processor 610 configured to process digitized forms of the captured codes 216 transmitted by the mobile device 106 during or after a walk-through inspection. The code processor 610 may be configured to map the digitized codes 216 to specific pieces of equipment and a location within the facility 102 where the equipment is located, which may be indexed in the data repository 130 as part of the configurations 318. The code processor 610 may also be configured to process codes 216 in order to retrieve content 608 that corresponds to the received codes 216.

The facility equipment monitoring tool 120 may further include a remedy module 612 configured to detect alarm conditions for pieces of equipment and to transmit requests to dispatch personnel who can address issues detected for a given piece of equipment. The remedy module 610 may include an alarm module 614 to detect triggering events that indicate an alarm condition. For example, answers received from the user 104 indicating values above a threshold (e.g., temperature values of a piece of equipment exceeding a threshold temperature, battery levels being below a threshold voltage reading, etc.), or particular options selected by the user that are designated as failing values (e.g., a particular answer to a Boolean question designated as a failing value), may be events that trigger alarm conditions determined by the alarm module 614. The alarm module 614 may be configured to determine that a piece of equipment is in a defective or failing state based on an alarm condition.

In some embodiments, the alarm module 614 may monitor whether individual facilities, such as the facility 102, have had walk-through inspections performed within a predetermined time interval, and if not, an alarm condition may be triggered. For example, the alarm module 614 may be configured to check the facility 102 every 12 hours (or any other suitable time interval) to see if a scheduled walk-through inspection has been conducted by a particular user 104. If the alarm module 614 determines that a walk-through inspection has occurred on schedule (e.g., within the 12 hour time interval), it may register an instance of the walk-through inspection being performed, and may reset a timer in order to monitor a subsequent time interval. If a time interval has lapsed without a walk-through inspection being performed, the alarm module 614 may trigger an alarm condition or may otherwise cause a state of the facility 102 to be designated as a delinquent state. Any of the detected alarm conditions relating to delinquent facility states may be displayed via the monitoring dashboard 132 for authorized users 138 to obtain a real-time view of those facilities 102 that are in delinquent states.

A dispatcher 616 may be included in the remedy module 612 to dispatch or otherwise broadcast a request for personnel to visit a facility 102 and/or defective piece of equipment in the facility 102 to fix, replace, or otherwise address an alarm condition, such as a defective piece of equipment, in an attempt to remedy the identified problem. The dispatcher 616 may open an electronic ticket as a means to transmit the dispatch request, and may transmit the ticket to other computing devices 606 that are configured to process tickets and route them to appropriate systems that direct the tickets to appropriate personnel (e.g., repair technicians). The dispatch requests (e.g., electronic tickets) may include information regarding the alarm condition triggering the dispatch request, such as information pertaining to the inspection of a piece of equipment, which may include the time (i.e., date and time) that the ticket was dispatched, the code 216 and other identifiers (e.g., a name) of the piece of equipment, an answer from the user 104 that triggered an alarm condition resulting in the piece of equipment being designated in a defective or failing state, the name or account identifier of the user 104 inspecting the equipment, and/or other information that may be relevant for personnel to understand the issue identified with the piece of equipment. Any suitable system may be utilized for routing dispatch requests to appropriate systems, such as electronic mail (e-mail) systems, cellular networks that route short message service (SMS) text messages and phone calls, message boards, and so on.

During a walk-through inspection, a dispatch request may be transmitted by the dispatcher 616 as soon as the dispatcher 616 receives an indication from the alarm module 614, which, in some cases, may be performed in a short time interval from receiving an answer from the user 104 that triggers an alarm condition. For example, if the user 104 conducting the walk-through inspection is using the mobile device 106 in an online mode, meaning that a network connection is available to the mobile device 106, an answer that triggers an alarm condition may cause the dispatcher 616 to automatically transmit a dispatch request (e.g., an electronic ticket) to the other computing devices 606 in response to the signal from the alarm module 614. In some embodiments, the remedy module 612 may be implemented on the mobile device 106 such that the dispatch request may be sent by the dispatcher 616 over the network 118 to appropriate systems directly from the mobile device 106. In other embodiments, the mobile device 106 may transmit logged data 322 to the central server(s) 116, and the dispatcher 616 in the memory 124 of the central server(s) may subsequently transmit a dispatch request. This may involve transmitting data to the central server(s) 116 as answers are received on the mobile device 106 (e.g., when the mobile device is operating in an online mode), or synching the logged data 322 to the central server(s) 116 when the mobile device 106 is able to connect to the network 118 after caching the logged data 322 in an offline mode.

Figure 7:
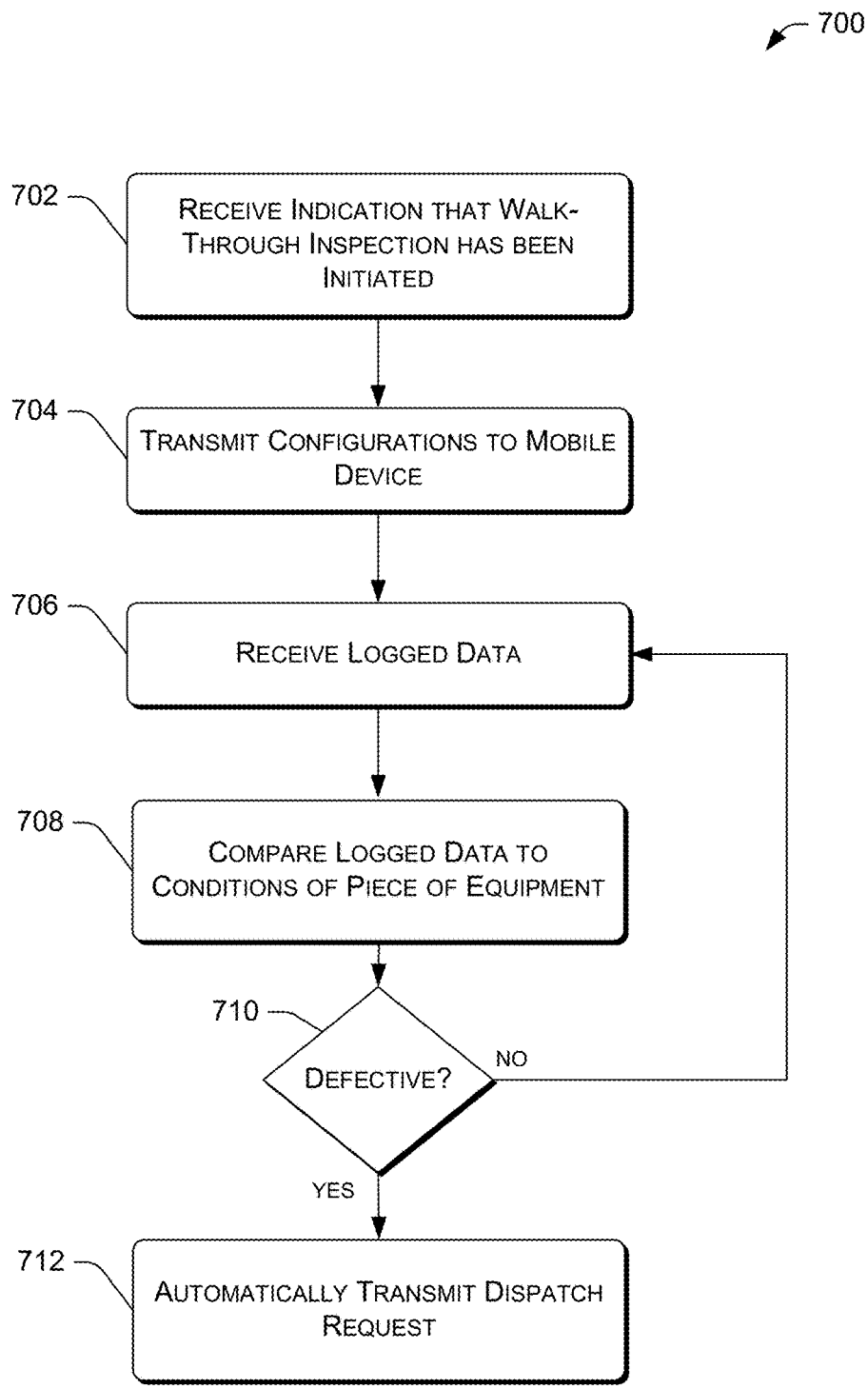
FIG. 7 is a flow diagram of an illustrative process for automatically transmitting a dispatch request for upon detecting an equipment defect.

FIG. 7 is a flow diagram of an illustrative process 700 for automatically transmitting a dispatch request upon determining that a piece of equipment is in a defective state. For discussion purposes, the process 700 is described with reference to the architecture 100 of FIG. 1, the diagram of FIG. 2, and the computing system 600 of FIG. 6.

At 702, the central server(s) 116 may receive, from the mobile device 106, an indication that a walk-through inspection of equipment within a facility 102 has been initiated. This indication may be received in response to the user 104 logging into the walk-through application 112, and/or the walk-through application 112 requesting to download the configurations 318 from the central server(s) 116.

At 704, the central server(s) 116 may transmit configurations 318 to the mobile device 106. The transmitting at 704 may be in response to a request, from the mobile device 106, to download the configurations 318. As noted above, the configurations 318 may include the current equipment in the facility 102, the locations of the individual pieces of equipment, survey questionnaires for individual pieces of equipment for assessing a current state (e.g., operational state verses defective or failing state) of the equipment, and other pertinent information for facilitating walk-through inspections within a facility 102. In addition, conditions for each piece of equipment that trigger alarms may be included in the configurations 318 so that alarm conditions can be detected based on answers to survey questions for a given piece of equipment. Conditions for a given piece of equipment may include thresholds (e.g., temperature thresholds, power thresholds, fuel level thresholds, etc.), or failing values to Boolean questions (e.g., "Yes or No" answers) that, if met, may trigger alarm conditions for a piece of equipment.

At 706, the central server(s) 116 may receive logged data 322 from the mobile device 106. The logged data 322 may include a variety of data collected by the mobile device 106 during at least a portion of a walk-through inspection, such as when the mobile device 106 performs the process 500 of FIG. 5. The logged data 322 received at 706 may include machine-readable codes 216 that have been captured by the code reader(s) 306 during a walk-through inspection, times (i.e., date and time) at which the machine-readable codes 216 were captured, answers to survey questions that were provided by the user 104, and other pertinent information collected during a walk-through inspection. The logged data 322 may be received during or after performance of a walk-through inspection whenever a network connection is available to the mobile device 106 for synching the logged data 322 with the central server(s) 116.

At 708, the received logged data 322 may be compared to conditions associated with the equipment in the facility 102. In some embodiments, such a comparison at 708 may be performed on the mobile device 106 with the downloaded conditions that may be included in the configurations transmitted at 704. Additionally, or alternatively, the comparison at 708 may be performed by components of the central server(s) 116, such as the alarm module 614. In this sense, the comparison at 708, when performed at the central server(s) 116 may be a confirmation of the comparison performed on the mobile device 106, and it may leverage some or all of the results of such a comparison performed on the mobile device 106. The comparison at 708 may include comparing values to thresholds (e.g., temperature thresholds, power thresholds, etc.), or comparing selected options (e.g., "Yes or No" answers) to conditions that trigger alarm conditions for any particular answer. Based on the comparison at 708, a determination may be made at 710 as to whether the piece of equipment is in a defective or failing state.

If it is determined at 710 that the piece of equipment is in a defective or failing state, a dispatch request may be automatically transmitted at 712 by the dispatcher 616 to request that personnel be sent to the piece of equipment to address the issue with the defective or failing piece of equipment. The personnel may be charged with fixing the piece of equipment, removing the piece of equipment and replacing it with a new piece of equipment, and so on. If the determination at 710 is that the piece of equipment is not defective, the process 700 may iterate back to 706 until the central server(s) 116 receives additional logged data pertaining to remaining pieces of equipment along a walk-through inspection.

The determination of the current state of the piece of equipment that is made at 710 may also cause the automatic display of a visual indicator (e.g., a color, symbol, stylized text, etc.) on a UI of the mobile device 106, such as the visual indicators shown in the region 410 of the UI 400. Such visual indicators provide a near real-time notification to the user 104 of the mobile device 106 of the current state of the piece of equipment the user 104 is inspecting.

Although steps of the process 700 have been described above in terms of performance by exemplary components of the central server(s) 116, it is to be appreciated that the process 700 may be implemented entirely on the mobile device 106 with similar components of the facility equipment monitoring tool 120 shown in FIG. 6 executing via the downloaded walk-through application 112 on the mobile device 106. In this scenario, dispatch requests may be transmitted in near real-time when the mobile device 106 is operating in an online mode and has network connectivity. In other embodiments, the steps of the process 700 may be performed by a combination of components between the central server(s) 116 and the mobile device 106.

As other stops 214 are visited during a walk-through inspection and as additional walk-through inspections are conducted, the data regarding the dispatch requests (e.g., a number of dispatch requests, times (i.e., date and time) that the dispatch requests are sent, a category of the dispatch requests (e.g., mechanical, electrical, etc.) may be stored in the data repository 130 and included in the logged data 322. In this manner, the logged data 322 regarding dispatch requests may be analyzed and surfaced in any suitable way to authorized users 138 that access the monitoring dashboard 132 to provide real-time and historical statistics regarding dispatch requests that have been sent, and breakdowns by month, week, day, etc., and by category, user, and so on. The monitoring dashboard 132 may allow an authorized user 138 to selectively manipulate reports and views of the logged data 322 regarding walk-through inspections and dispatch requests in graphical form, tables, charts, and the like.

In some embodiments, other types of alarms may be triggered by events that occur with respect to scheduled walk-through inspections. For example, a given facility 102 may schedule walk-through inspections to be conducted by a user 104 at particular intervals of time, such as daily, or twice daily, walk-through inspections. The specified time interval may be monitored by the facility equipment monitoring tool 120, and if a walk-through inspection has not been completed by the user 104 within the specified time interval, an alarm condition may be triggered that causes a notification to be surfaced via the monitoring dashboard 132 and/or a message to be transmitted by the dispatcher 616. The facility equipment monitoring tool 120 may also designate a facility as being in an outstanding or delinquent state if a user 104 does not perform walk-through inspections on schedule. A suitable mechanism to check whether walk-through inspections are being conducted in a timely fashion and by the correct users is via the code capture process using the code reader 306 of the mobile device 106 during a walk-through inspection. By logging a captured code 216 at a known location with a time at which the code was captured, the facility equipment monitoring tool 120 may be configured to determine that a user 104 completed a walk-through inspection per the predetermined schedule. If no logged data 322 has been received or synched with the central server(s) within a schedule interval for completing a walk-through inspection, the alarm module 614 may determine that an alarm condition is triggered.

The logged data 322 may also be analyzed to determine whether a user 104 visited the stops 214 of a walk-through inspection in the correct order, and whether the user 104 answered all of the questions in a survey while the mobile device was located at the stop 214. This auditing functionality provides a mechanism to further ensure that equipment is being inspected, that it is being inspected on time, and that alarms are being triggered in a timely manner due to the entry of data via the directed workflow interface of the walk-through application 112.

Figure 8:
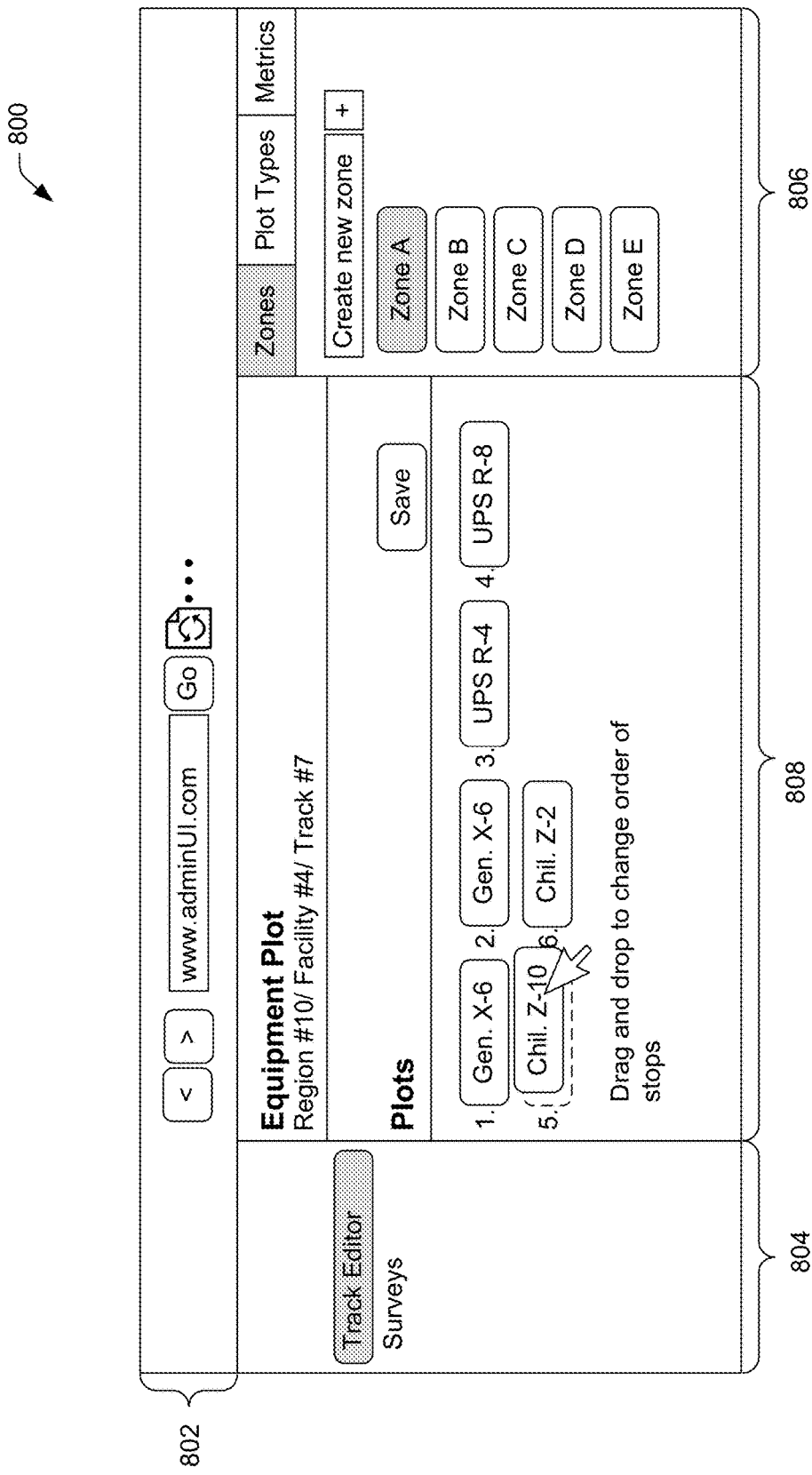
FIG. 8 illustrates a screen rendering of an example administrative user interface that may be presented on a client computing device in order to modify configurations with respect to one or more facilities.

FIG. 8 illustrates a screen rendering of an example administrative UI 800, which may represent an example of the administrative interface 134 introduced with reference to FIG. 1. The administrative UI 800 may be presented on the client computing device 136 when an authorized user 138

(e.g., an administrator) logs into the facility equipment monitoring tool 120 with their credentials (e.g., user name and password, personal identification number (PIN), etc.). The administrative UI 800 enables the administrator to modify configurations 318 with respect to one or more facilities, such as the facility 102. The UI 800 may comprise a graphical user interface (GUI). In some embodiments, the UI 800 may be a browser (e.g., a web browser) that can format text based on HTML code.

The UI 800 may include a navigation bar or region 802 where navigation elements or controls are displayed, such as an address field for entering a uniform resource locator (URL) for a website associated with the administrative UI 800, and other navigation elements to perhaps navigate between different pages. The UI 800 may further include a menu bar or region 804 to select from various options to edit different types of configuration information, such as a "Track Editor" to edit data pertaining to particular walk-through inspection tracks or paths 212 including, without limitation, the zones 210 of the facility 102, stops 214 along a walk-through path 212, and the order of stops 214 for a given facility 102. The region 804 may further include a selection for "Surveys" in order to create, modify, or delete surveys to be used at the various stops 214 along a walk-through inspection. Through the "Surveys" selection, an administrator may be able to create, modify, or delete particular questions of a survey. A selection region 806 may be provided to select or delete existing zones from a list of available zones in a facility 102, and to create new zones. The selection region 806 may further provide other options to select items such as "Plot Types" and "Metrics" to modify configuration information with respect to plots and metrics. A "plot" is used herein to denote a set of stops 214 that may be arranged in any particular order to create a path 212 for a walk-through inspection. Different plots may relate to different types of systems or categories for inspection. For example, plots may be categorized as a mechanical system plots, or electrical system plots, or any arbitrary type of plot. Metrics may include things like pressure, temperature, voltage, power, volume, fuel level, and the like, which may be measured for a given piece of equipment within the facility 102. These may represent quantities that are referenced in the survey questions presented to the user 104 when inspecting a piece of equipment during a walk-through inspection.

The UI 800 may further include a drag-and-drop region 808 where an administrator, having selected a region, a facility 102 in that region, and a zone 210 (e.g., Zone A) within that facility 102, may create set of ordered stops 214 for inspecting various pieces of equipment within the zone of that facility 102. When an ordered list of stops 214 has been created, the administrator may modify the order by "dragging and dropping" individual elements that represent each stop 214 to a different position in the order, thereby automatically propagating the order of downstream elements in the list. The administrator may also add new stops 214, and delete existing stops 214. Once the administrator is satisfied with a given order of stops 214, he/she may save that ordered arrangement, which may be stored as part of the configurations 318 within the data repository 130. When a stop 214 is added to a plot, the administrator may be presented with a UI to specify certain parameters for the stop being created, such as the type of survey the administrator wants to be tied to that stop 214, the equipment at that stop 214, a machine-readable code 216 tied to the equipment at the stop 214, and so on.

The environment and individual elements described herein may of course include many other logical, programmatic, and physical components, of which those shown in the accompanying figures are merely examples that are related to the discussion herein.

The various techniques described herein are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method comprising:
running, on a mobile computing device, an application to support a walk-through inspection of equipment within a facility;
downloading, to the mobile computing device, questions for each piece of equipment for assessing a current state of each piece of equipment;
reading, with a code reader of the mobile computing device, machine-readable codes that are collocated with respective pieces of equipment along the walk-through inspection;
retrieving the questions based at least in part on the machine-readable codes being read with the code reader;
presenting, on a display of the mobile computing device, the questions along with fields or choices for answering the questions;
receiving, via an input device of the mobile computing device, user input indicating answers to the questions; and
presenting, on the display of the mobile computing device, an auditing notification for a user logged into the application based at least in part on deriving, from times at which the machine-readable codes were read, an order in which the user visited multiple stops along the walk-through inspection, as compared to a predetermined order of the multiple stops.

2. The computer-implemented method of claim 1, wherein the answers include a first answer to a first question of the questions and a second answer to a second question of the questions, the method further comprising:
- downloading information for conditions of the equipment that are indicative of a state of each piece of equipment;
- comparing the first answer to the conditions to determine that the first answer triggers an alarm condition;
- presenting, on the display of the mobile computing device, a first visual indicator indicating that the first answer has triggered the alarm condition;
- comparing the second answer to the conditions to determine that the second answer does not trigger the alarm condition; and
- presenting, on the display of the mobile computing device, a second visual indicator indicating that the second answer has not triggered the alarm condition.

3. The computer-implemented method of claim 1, further comprising uploading, to a remote computing device:
- the machine-readable codes read with the code reader;
- the times at which the machine-readable codes were read; and
- the answers.

4. The computer-implemented method of claim 1, further comprising:
- presenting, on the display of the mobile computing device, respective equipment-level visual indicators to indicate current respective states of the respective pieces of equipment based on the answers.

5. The computer-implemented method of claim 1, further comprising displaying a map indicating the multiple stops along the walk-through inspection and the respective pieces of equipment associated with the multiple stops.

6. A mobile computing device comprising:
- one or more processors;
- memory storing an application that is executable by the one or more processors to support walk-through inspections of equipment within a facility; and
- a code reader to capture machine-readable codes that are collocated with respective pieces of equipment along a walk-through inspection;
- wherein the application, when executed by the one or more processors, is configured to:
  - present, on the mobile computing device, questions for assessing current respective states of the respective pieces of equipment in response to the machine-readable codes being captured by the code reader;
  - receive answers to the questions that are provided via user input to the mobile computing device; and
  - present an auditing notification for a user logged into the application based at least in part on deriving, from times at which the machine-readable codes were captured, an order in which the user visited multiple stops along the walk-through inspection, as compared to a predetermined order of the multiple stops.

7. The mobile computing device of claim 6, further comprising a communication interface to download, from a remote computing device, information for the walk-through inspection and to upload, to the remote computing device:
- the machine-readable codes captured by the code reader during the walk-through inspection;
- the times at which the machine-readable codes were captured; and
- the answers pertaining to the respective pieces of equipment along the walk-through inspection.

8. The mobile computing device of claim 6, wherein the application is further configured to present respective equipment-level visual indicators to indicate the current respective states of the respective pieces of equipment based on the answers to the questions.

9. The mobile computing device of claim 6, wherein the application is further configured to present a map indicating the multiple stops along the walk-through inspection and the respective pieces of equipment.

10. The mobile computing device of claim 6, wherein the application is further configured to:
- determine, based on the answers to the questions, that a current state of an individual piece of equipment is a defective state; and
- cause transmission of a request to dispatch personnel to the individual piece of equipment.

11. The mobile computing device of claim 6, wherein the questions comprise a dynamic list of questions that utilizes a decision tree to choose one or more follow up questions based on receipt of particular answers to individual ones of the questions.

12. A computer-implemented method comprising:
- executing, on a mobile computing device, an application to support a walk-through inspection of equipment within a facility;
- reading, with a code reader of the mobile computing device, machine-readable codes that are collocated with respective pieces of equipment along the walk-through inspection;
- presenting, on the mobile computing device, questions for assessing current respective states of the respective pieces of equipment;
- receiving, via user input to the mobile computing device, answers to the questions; and
- presenting, on the mobile computing device, an auditing notification for a user logged into the application based at least in part on an order in which the user visited multiple stops along the walk-through inspection, as compared to a predetermined order of the multiple stops, the order in which the user visited the multiple stops having been derived from times at which the machine-readable codes were read with the code reader.

13. The computer-implemented method of claim 12, further comprising:
- presenting, on the mobile computing device, respective equipment-level visual indicators to indicate the current respective states of the respective pieces of equipment based on the answers.

14. The computer-implemented method of claim 12, further comprising presenting, on the mobile computing device, a map indicating the multiple stops and the respective pieces of equipment along the walk-through inspection.

15. The computer-implemented method of claim 12, further comprising:
- determine, based at least in part on at least one answer of the answers, that a current state of an individual piece of equipment is a defective state; and
- causing transmission of a request to dispatch personnel to the individual piece of equipment.

16. The computer-implemented method of claim 12, wherein the questions comprise a dynamic list of questions that utilizes a decision tree to choose one or more follow up questions based on receipt of particular answers to questions.

17. The computer-implemented method of claim 12, further comprising:

receiving, from a remote computing device, information for the walk-through inspection prior to the reading of the machine-readable codes, wherein the information includes a condition that is indicative of a state of the equipment; and assessing the current respective states of the respective pieces of equipment by comparing at least one answer of the answers to the condition.

18. The computer-implemented method of claim 12, further comprising uploading, to a remote computing device:

the machine-readable codes read by the code reader during the walk-through inspection;

the times at which the machine-readable codes were read; and the answers.

19. The computer-implemented method of claim 12, wherein the comparing of the at least one answer to the condition further comprises at least one of comparing a numerical answer to a threshold value or comparing a Boolean answer to a failing value for the Boolean answer.

20. The computer-implemented method of claim 12, wherein the comparing of the first answer or the second answer to the conditions further comprises at least one of comparing a numerical answer to a threshold value or comparing a Boolean answer to a failing value for the Boolean answer.

* * * * *